United States Patent
Barton et al.

(10) Patent No.: US 8,345,839 B2
(45) Date of Patent: Jan. 1, 2013

(54) SYSTEM AND METHOD FOR PROVIDING AWARENESS OF AND CONTEXT FOR PHONE CONVERSATIONS ACROSS MULTIPLE PERSONAL DEVICES

(75) Inventors: John J. Barton, Los Gatos, CA (US); Jeffrey W. Nichols, San Jose, CA (US); Jeffrey S. Pierce, San Jose, CA (US); Min Yin, Sunnyvale, CA (US); Shumin Zhai, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 12/121,817

(22) Filed: May 16, 2008

(65) Prior Publication Data

US 2009/0285372 A1 Nov. 19, 2009

(51) Int. Cl.
*H04M 11/00* (2006.01)
(52) U.S. Cl. .............................. 379/93.23; 379/142.07
(58) Field of Classification Search .............. 379/93.23, 379/373.01, 142.07; 709/225
See application file for complete search history.

(56) References Cited

U.S. PATENT DOCUMENTS

| | | | |
|---|---|---|---|
| 5,054,042 A | 10/1991 | Soury et al. | |
| 7,069,328 B1 | 6/2006 | Bell | |
| 7,315,614 B2 * | 1/2008 | Bedingfield et al. | 379/142.07 |
| 7,418,096 B2 * | 8/2008 | Moton et al. | 379/373.01 |
| 2005/0209861 A1 | 9/2005 | Hewes et al. | |
| 2008/0177878 A1 * | 7/2008 | Pierce | 709/225 |
| 2009/0161845 A1 * | 6/2009 | Adams et al. | 379/93.23 |

OTHER PUBLICATIONS

Flores, et al., Computer Systems and the Design of Organizational Interaction, ACM Transactions on Office Information Systems, col. 6, No. 2, Apr. 1988, pp. 153-172.
Jung, et al., DeDe: Design and Evaluation of a Context-Enhanced Mobile Messaging Systems, CHI 2005, Papers: Design Thoughts & Methods, Apr. 2-7, pp. 3561-360.
Lehikoinen, et al., PePe Field Study: Construction Meanings for Locations in the Context of Mobile Presence, Nokia Research Center, Sep. 12-15, 2006, pp. 53-60.
Mundinger, et al., "Reputation in Self-Organized Communication Systems and Beyond," EPFL-IC-LCA, Oct. 14, 2006, pp. 1-10.
Akhtar, et al., "Context Dissemination for Automatic Communication Systems, " Inspec, AN-8903034, 2006, ABS Only, 1 page.

* cited by examiner

*Primary Examiner* — Fan Tsang
*Assistant Examiner* — Van D Huynh
(74) *Attorney, Agent, or Firm* — Gibb & Riley, LLC

(57) ABSTRACT

Disclosed are embodiments of a system and method for automating the exchange of information between the multiple personal computerized devices of an entity so as to provide context for communications, such as incoming and/or outgoing telephone calls, with other entities. The system and method associate one entity with multiple devices. Communications over a device (e.g., one of the various types of telephones) are tracked. Then, for a given communication, an identifier (e.g., a caller ID from an incoming telephone call) is communicated to at least one other device. The other device performs a local and/or internet search for information associated with that particular identifier. The retrieved information is then displayed so as to provide the entity with essentially instantaneous context for the given communication. The system can be implemented using client-server network technology or, alternatively, using point-to-point communication technology.

25 Claims, 4 Drawing Sheets

SYSTEM AND METHOD FOR PROVIDING AWARENESS OF AND CONTEXT FOR PHONE CONVERSATIONS ACROSS MULTIPLE PERSONAL DEVICES

BACKGROUND

1. Field of the Invention

The embodiments of the invention relate to computerized devices and, more particularly, to a system and method for automating the exchange of information between the multiple personal computerized devices of one entity so as to provide context for communications with other entities over one of the devices.

2. Description of the Related Art

With advances in technology, most individuals own or have control over multiple personal computerized devices. Such devices can include, but are not limited to, home and office desktop computers, laptop computers, personal digital assistants (PDAs), wired telephones, wireless telephones, voice-over internet protocol (VOIP) telephones, etc. Often times, when communicating with another party over one device (e.g., over any one of the various types of telephones), it is helpful to have access to information that is stored and/or accessible by another device (e.g., a laptop or desktop computer, a PDA, etc.) in order to provide context for communication. Typically, this requires prior planning. For example, if a phone call is anticipated, a person receiving the phone call can assemble all the required information in one place and then take measures to ensure that the information is accessible during the phone call. However, if a call is not anticipated and/or if prior planning is not practicable, the parties to the phone call may waste valuable time at the onset of the phone call trying to locate the appropriate context information. Therefore, there is a need in the art for a system and method for automating the exchange of information between the multiple personal computerized devices of one entity so as to provide context for communications with other entities over one of the devices.

SUMMARY

In view of the foregoing, disclosed herein are embodiments of a system and method for automating the exchange of information between the multiple personal computerized devices of an entity so as to provide context for communications, such as incoming and/or outgoing telephone calls, with other entities. The system and method associate one entity with multiple devices (e.g., home and office desktop computers, laptop computers, personal digital assistants (PDAs), wired telephones, wireless telephones, voice-over internet protocol (VOIP) telephones, etc.). Communications over a device (e.g., one of the various types of telephones) are tracked. Then, for a given communication, an identifier (e.g., a caller ID from an incoming telephone call) is communicated to at least one other device. The other device performs a local and/or internet search for information associated with that particular identifier. The retrieved information is then displayed so as to provide the entity with essentially instantaneous context for the given communication. The system can be implemented using client-server network technology or, alternatively, using point-to-point communication technology.

In the client-server network embodiment of the system, the system comprises a first device and at least one second device associated with the same first entity. The second device can comprise a memory. The system can also comprise a server in communication with the first device and the second device. The server detects communications over the first device and, for at least one communication between the first device and an external device (e.g., another device associated with a different second entity), automatically communicates an identifier associated with the external device, to the second device. The second device receives the identifier and locally searches its memory for information associated with the identifier. Then, the first device and/or the second device displays the information so as to provide the first entity with context for the communication.

In the point-to-point communications embodiment of the system, the system similarly comprises a first device and at least one second device associated with the same entity. The second device can comprise a memory and can be in direct communication with the second device. In response to a communication between the first device and an external device (e.g., another device associated with a different entity), the first device can automatically communicate to the second device an identifier associated with the external device. The second device receives the identifier and locally searches its memory for information associated with the identifier. Then, the first device and/or the second device displays the information so as to provide the entity with context for the communication.

The method embodiments comprise, in response to a communication between a first device and an external device, automatically communicating an identifier associated with the external device to a second device so as to cause the second device to locally search memory within the second device for information associated with the identifier. In this case, the first and second devices are associated with the same first entity and the external device is associated with a different second entity. Communication between the first and second devices can be direct (e.g., via point-to point communication) or indirect (e.g., via a server). Once local search is completed, then the first device and/or the second device will display the information so as to provide the first entity with context for the incoming communication.

Also disclosed herein are embodiments of a computer program product comprising a computer usable medium for having computer usable program code embodied therewith, the computer program code comprising a computer usable program code configured to perform the above-described method of automating the exchange of information between multiple personal computerized devices.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, with advances in technology, most individuals own or have control over multiple personal computerized devices. Such devices can include, but are not limited to, home and office desktop computers, laptop computers, personal digital assistants (PDAs), wired telephones, wireless telephones, voice-over internet protocol (VOIP) telephones, etc. Often times, when communicating with another party over one device (e.g., over any one of the various types of telephones), it is helpful to have access to information that is stored and/or accessible by another device (e.g., a laptop or desktop computer, a PDA, etc.) in order to provide context for communication. Typically, this requires prior planning. For example, if a phone call is anticipated, a person receiving the phone call can assemble all the required information in one place and then take measures to ensure that the information is accessible during the phone call. However, if a call is not anticipated and/or if prior planning is not practicable, the parties to the phone call may waste valuable time at the onset of the phone call trying to locate the appropriate context information.

In view of the foregoing, disclosed herein are embodiments of a system and method for automating the exchange of information between the multiple personal computerized devices of an entity so as to provide context for communications, such as incoming and/or outgoing telephone calls, with other entities. The system and method associate one entity with multiple devices (e.g., home and office desktop computers, laptop computers, personal digital assistants (PDAs), wired telephones, wireless telephones, voice-over internet protocol (VOIP) telephones, etc.). Communications over a device (e.g., one of the various types of telephones) are tracked. Then, for a given communication, an identifier (e.g., a caller ID from an incoming telephone call) is communicated to at least one other device. The other device performs a local and/or internet search for information associated with that particular identifier. The retrieved information is then displayed so as to provide the entity with essentially instantaneous context for the given communication. The system can be implemented using client-server network technology or, alternatively, using point-to-point communication technology.

Figure 1:
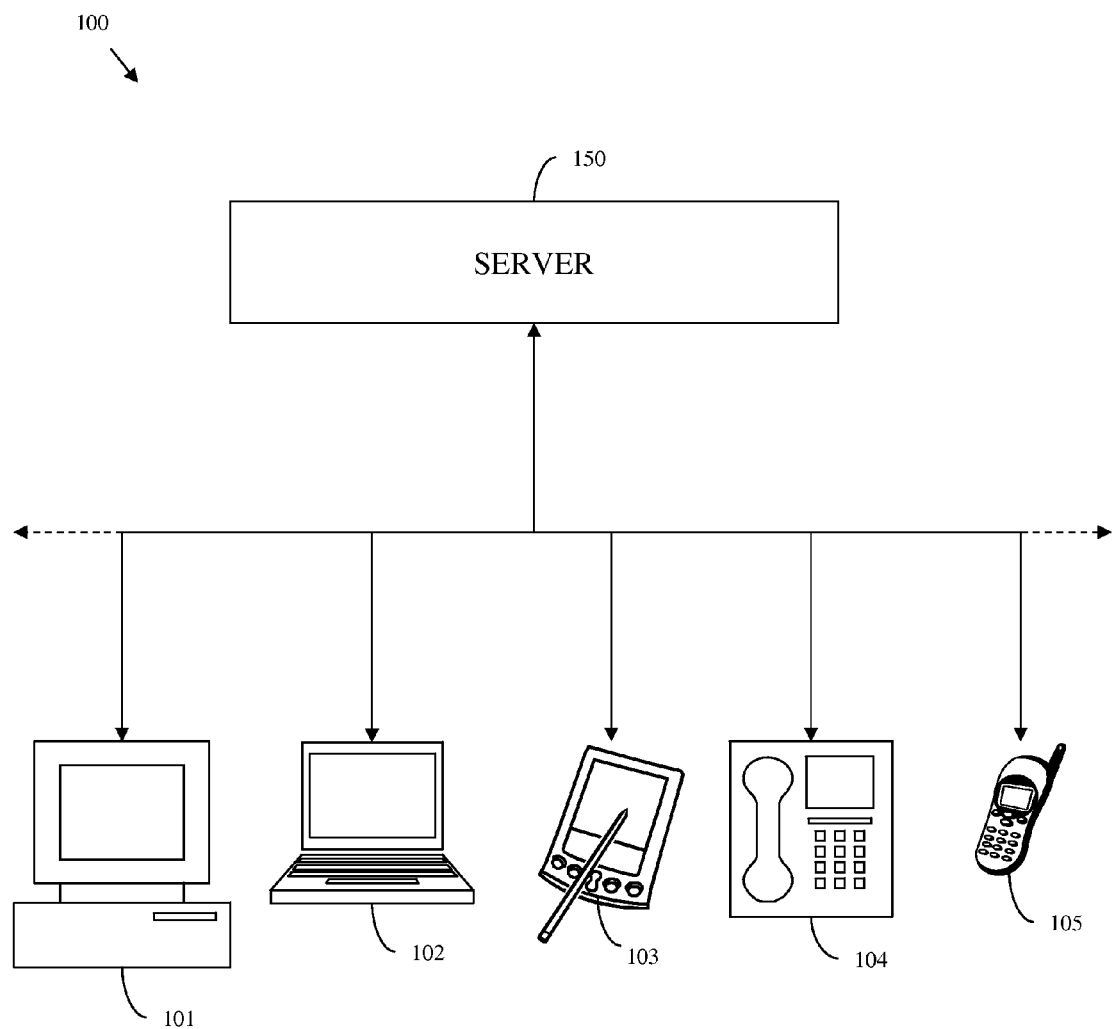
FIG. 1 is block diagram illustrating an embodiment of the system of the present invention.

Referring to FIG. 1, in the client-server network embodiment, the system 100 incorporates a server 110 for automating the exchange of information between the multiple personal computerized devices 101-105 associated with the same first entity. That is, these multiple devices 101-105 can be owned or in the control of a single person, group, company, etc. and can comprise, for example, home and office desktop computers 101, laptop computers 102, personal digital assistants (PDAs) 103, wired telephones 104, wireless telephones 105, voice-over internet protocol (VOIP) telephones, etc.

Figure 2:
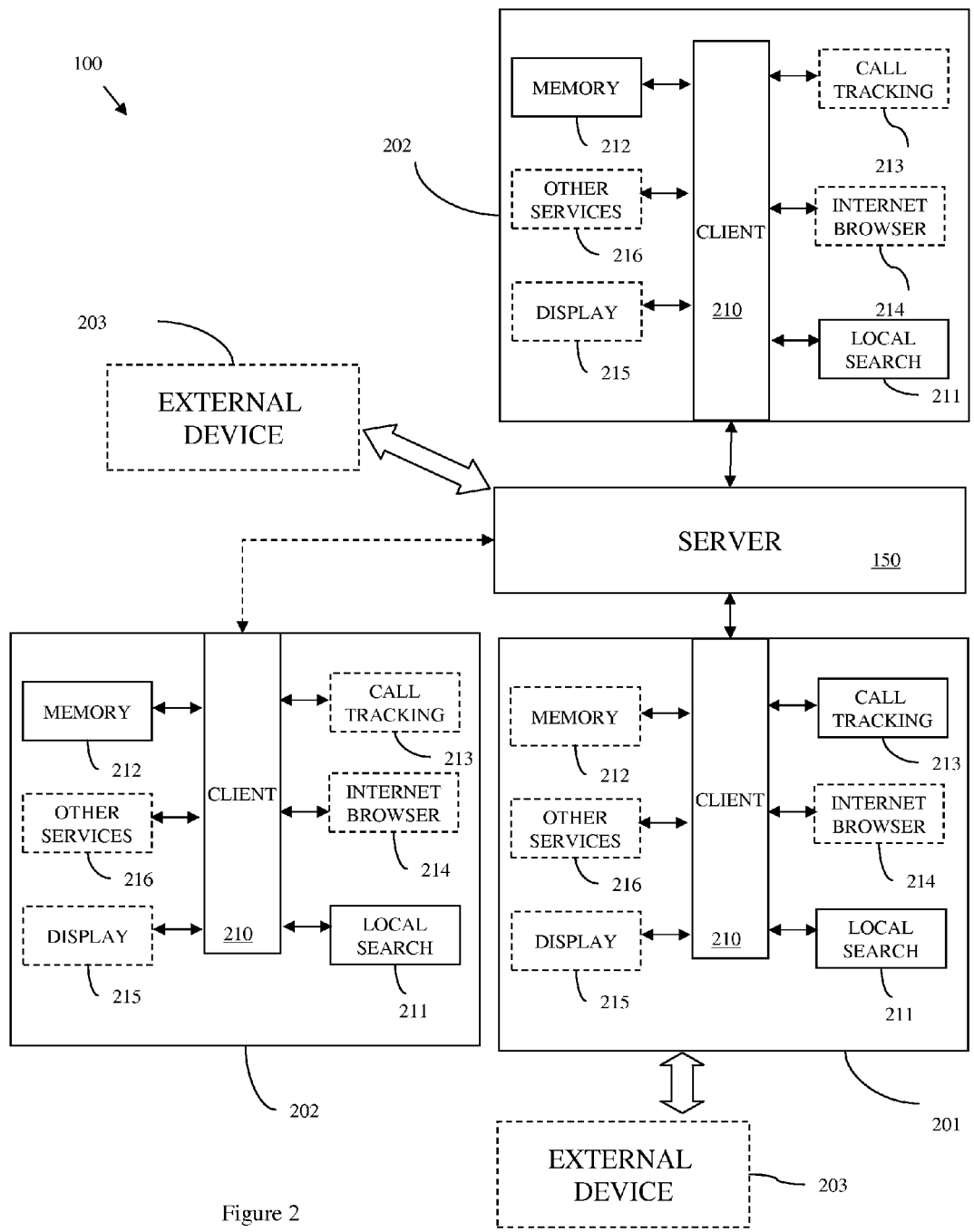
FIG. 2 is another block diagram illustrating an embodiment of the system of the present invention.

Specifically, referring to FIG. 2, the system 100 comprises a first device 201 associated with this first entity. This first device 201 can comprise a device that is capable of making and receiving telephone calls and that has a call tracking function 213 such that it is capable of tracking both dialed and received calls (e.g., caller ID). Thus, the first device 201 can comprise a wired telephone, a wireless telephone, a voice-over internet protocol (VOIP) telephone, a personal digital assistant (PDA) or any other such device capable of making and receiving telephone calls and having a call tracking function 213. In addition to the features described above, the first device 201 can optionally comprise a memory 212, a local search function 211 (e.g., a desktop search function), an internet browser 214, a display 215, and/or one or more other services or applications 216 (e.g., email applications, word processing applications, etc.).

The system 100 can also comprise one or more second devices 202. Each second device 202 can be associated with the first entity and can comprise a corresponding memory 212 and a local search function 211 (e.g., a desktop search function). The second device(s) 202 can comprise, for example, a laptop computer, a desktop computer, a PDA, and/or any other device having a memory 212 and local search function 211. In addition to the features described above, the second device(s) 202 can optionally comprise an internet browser 214, a display 214, a call tracking function 213, and/or one or more other services or applications 216 (e.g., email applications, word processing applications, etc.). Thus, the system 100 comprises a combination of phone and computer (PnC) infrastructures and personal information environments (PIEs).

The system 100 can also comprise a server 150 in communication with the first device 201 and the second device(s) 202. This server 150 can provide a means by which information (e.g., web pages, data, images, documents, files, folders, etc.) can be exchanged between the devices 201-202. This exchange of information can be accomplished, for example, by using an instant messaging (IM) architecture. That is, for a given entity, each device 201-202 can have a different address that is associated with that entity (e.g., userid@server/device). The server 150 can maintain a list of all such addresses and information exchange between the devices 201-202 can be routed through the server 150 to the devices 201-202 by instant message using the appropriate addresses. Additionally, in this embodiment, traditional instant messaging can be extended to allow the server 150 to access and/or run the various applications 211-216 on the different devices 201-202. That is, each device 201-202 can comprise a client 210 (e.g., interface software). The client 210 on a given device can provide the necessary interface to allow communications (e.g., instructions and responses, respectively) between the server 150 and the various applications or services 211-216 available on that given device. The use of clients 210 avoids direct communication between the server 150 and the device applications 211-216, It should be noted that the above-described infrastructure is not intended to be limiting and other such systems and methods that use a server to allow for multi-device communication (e.g., as disclosed in the U.S. patent application Ser. No. 11/625,358 of Pierce filed on Jan. 22, 2007 and incorporated herein by reference) can alternatively be used to implement the present invention.

In this embodiment, the server 150, not only provides the means by which information is exchanged, but also controls the automated exchange of information between these devices 201-202 in response to communications, such as incoming and/or outgoing telephone calls. Specifically, the server 150 can detect communications (e.g., incoming and/or outgoing telephone calls) over the first device 201. For example, the server 150 through the client 210 in the first device 201 can track dialed and received calls using the call tracking function 213 within the first device 201. Then, for a given communication between the first device 201 and external device 203 (i.e., a device associated with a different second entity), the server 150 can automatically communicate an identifier associated with that external device 203 to any one of the second devices 202. This identifier can, for example, comprise caller identification data, including but not limited to, a personal or business name and/or a telephone number.

Upon receiving the identifier, the second device 202 can locally search its memory 212 for information (e.g., a previously viewed web page, an image, a message, a document, a file, a folder, etc.) associated with that particular identifier. This local search can, for example, be accomplished through the use of a local search function 211 (e.g., a local desktop search engine) capable of retrieving information stored in memory 212 through one or more applications or services 216 (e.g., through an email application, an internet browser 214, a word processor, etc.). If the second device 202 is configured with an internet browser 214, the second device 202 can also use the internet browser 214 to search for additional information associated with the identifier. Upon completion of the local and/or internet searches, one or more of the devices 201-202 can display the retrieved information (i.e., can display the information found pursuant to a local search and, if applicable, the additional information found pursuant to an internet search) on a display 215 in order to provide the first entity with essentially instantaneous context for the given communication be it an incoming telephone call or an outgoing telephone call.

Optionally, the first device 201 or the second device 202 can communicate the retrieved information found pursuant to a local search (and, if applicable, the retrieved additional information found pursuant to an internet search) to a second entity that is associated with the external device 203. Rather than sending the actual retrieved information (e.g., files, text, etc.) to the second entity, the devices 201-202 may alternatively send links or pointers (e.g., suggested keywords) that will allow the second entity to retrieve the information. Information communicated to the second entity may be over any external device associated with the second entity. For example, the initial communication with the second entity may be over a telephone; however, the retrieved information may be communicated by email, instant message, etc. to the second entity's computer. Communication of this context information by the first or second devices 201-202 to the second entity can be accomplished indirectly via the server 150 or directly (i.e., point-to-point).

It should be noted that the server 150 can be adapted to control this automated exchange of information between multiple devices 201-202 based on default settings and/or instructions received from the first entity via any one of the devices 201-202. These defaults settings and/or user-provided instructions can designate, for example, the types of communications to respond to or track (e.g., incoming and/or outgoing telephone calls, the types of searches (e.g., local and/or internet), the type(s) of information to be displayed (e.g., web pages, images, documents by type, etc.), the specific device or devices (e.g., a device address) on which the information is to be displayed, the specific identifier or identifiers (e.g., a caller ID) for which information is to be displayed, the specific item or items of information (e.g., a named document, email message or web address) to be displayed in response to a specific identifier, the time-frame of the information (e.g., only information accessed or viewed within a given time period), etc. Thus, depending upon the default settings and/or user-provided instructions, not all communications will initiate automated searches and displays. Also, depending upon the default settings and/or user-provided instructions, when an identifier is communicated by the server 150 to a second device 202 (e.g., via a client 210), it may be accompanied by appropriate search, upload and/or display instructions, which can be executed by the applications 211-216, as necessary.

Figure 3:
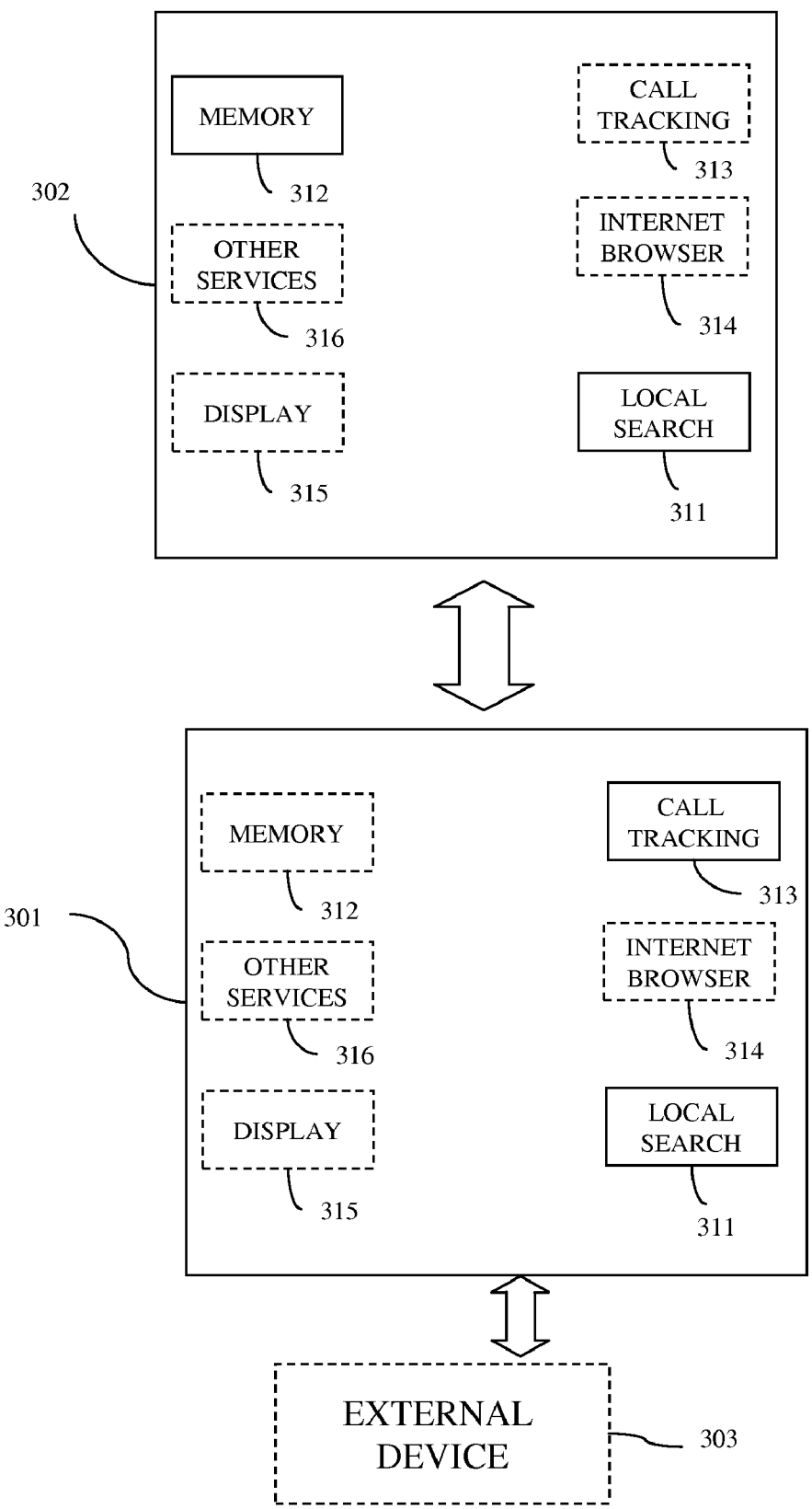
FIG. 3 is a block diagram illustrating another embodiment of the system of the present invention.

Referring to FIG. 3, in the point-to-point communication embodiment, the system 300 similarly comprises a first device 301 and a second device 302 associated with the same first entity. This first device 301 can comprise a device that is capable of making and receiving telephone calls and that has a call tracking function 313 such that it is capable of tracking both dialed and received calls (e.g., caller ID). Thus, the first device 301 can comprise a wired telephone, a wireless telephone, a voice-over internet protocol (VOIP) telephone, a personal digital assistant (PDA) or any other such device capable of making and receiving telephone calls and having a call tracking function 313. In addition to the features described above, the first device 301 can optionally comprise a memory 312, a local search function 311 (e.g., a desktop search function), an internet browser 214, a display 315, and/or one or more other services or applications 316 (e.g., email applications, word processing applications, etc.).

The system 300 can also comprise one or more second devices 302. Each second device 302 can comprise a corresponding memory 312 and a local search function 311 (e.g., a desktop search function). The second device(s) 302 can comprise, for example, a laptop computer, a desktop computer, a PDA, and/or any other device having a memory 312 and local search function 311. In addition to the features described above, the second device(s) 302 can optionally comprise an internet browser 314, a display 314, a call tracking function 313, and/or one or more other services or applications 316 (e.g., email applications, word processing applications, etc.). Thus, the system 300 comprises a combination of phone and computer (PnC) infrastructures and personal information environments (PIEs).

However, in this embodiment communications between the first and second devices 301-302 are achieved using point-to-point communication technology rather than a server. For example, the first and second devices 301-302 can communicate directly using wireless communication and networking technology such as, Bluetooth® or Bonjour®.

In this embodiment, the automated exchange of information between these devices 301-302 in response to communications, such as incoming and/or outgoing telephone calls, is controlled locally. Specifically, the first device 301 tracks incoming and/or outgoing telephone calls (e.g., using tracking function 313). Then, for a given communication between the first device 301 and an external device 303 (i.e., a device associated with a different second entity), the first device 301 automatically communicate to the second device(s) 302 an identifier associated with that external device 303. This identifier can, for example, comprise caller identification data, including but not limited to, a personal or business name and/or a telephone number.

Upon receiving the identifier, the second device 302 can locally search its memory 312 for information (e.g., a previously viewed web page, an image, a message, a document, a file, a folder, etc.) associated with that particular identifier. This local search can, for example, be accomplished through the use of a local search function 311 (e.g., a local desktop search engine) capable of retrieving information stored in memory 312 through one or more applications or services 316 (e.g., through an email application, an internet browser 314, a word processor, etc.). If the second device 302 is configured with an internet browser 314, the second device 302 can also use the internet browser 314 to search for additional information associated with the identifier. Upon completion of the local and/or internet searches, one or more of the devices 301-302 can display the retrieved information (i.e., can display the information found pursuant to a local search and, if applicable, the additional information found pursuant to an internet search) on a display 315 in order to provide the first entity with essentially instantaneous context for the given communication be it an incoming telephone call or an outgoing telephone call.

Optionally, the first device 301 or the second device 302 can communicate the retrieved information found pursuant to a local search (and, if applicable, the retrieved additional information found pursuant to an internet search) to the second entity that is associated with the external device 303. Rather than sending the actual retrieved information (e.g., files, text, etc.) to the second entity, the devices 301-302 may alternatively send links or pointers (e.g., suggested keywords) that will allow the second entity to retrieve the information. Information communicated to the second entity may be over any external device associated with the second entity. For example, the initial communication with the second entity may be over a telephone; however, the retrieved information may be communicated by email, instant message, etc. to the second entity's computer.

It should be noted that this automated exchange of information between multiple devices 301-302 may be based on default settings and/or instructions received by any one of the devices 301-302 from the first entity. These defaults settings and/or user-provided instructions can designate, for example, the types of communications to respond to or track (e.g., incoming and/or outgoing telephone calls, the types of searches (e.g., local and/or internet), the type(s) of information to be displayed (e.g., web pages, images, documents by type, etc.), the specific device or devices (e.g., a device address) on which the information is to be displayed, the specific identifier or identifiers (e.g., a caller ID) for which information is to be displayed, the specific item or items of information (e.g., a named document, email message or web address) to be displayed in response to a specific identifier, the time-frame of the information (e.g., only information accessed or viewed within a given time period), etc. Thus, depending upon the default settings and/or user-provided instructions, not all communications will initiate automated searches and displays.

Figure 4:
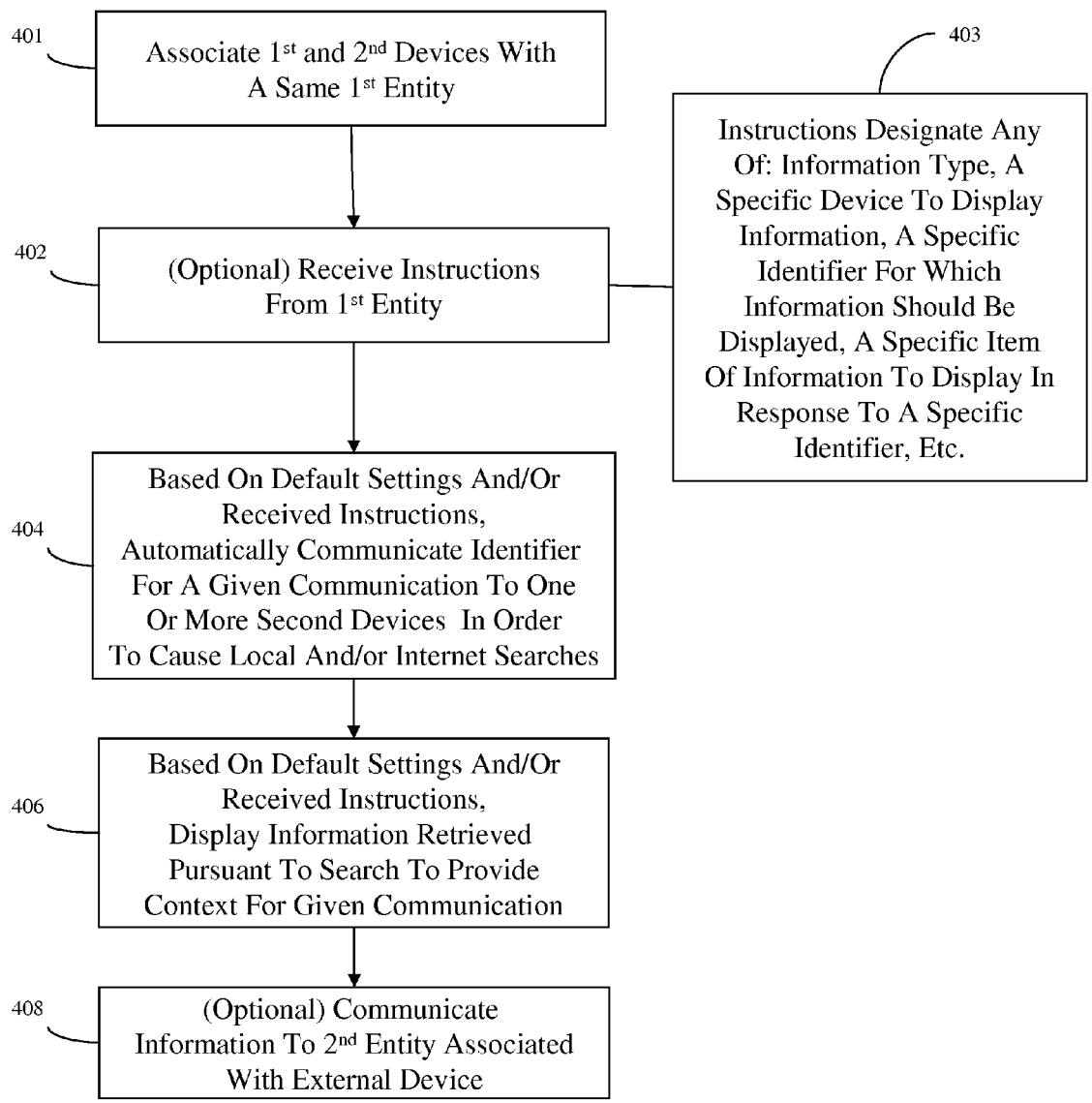
FIG. 4 is a flow diagram illustrating an embodiment of the method of the present invention.

Referring to FIG. 4 in combination with FIGS. 1-3, also disclosed herein are embodiments of an associated method for automating the exchange of information between the multiple personal computerized devices of an entity. The method embodiments comprise associating a first device 201, 301 (e.g., a wired telephone, a wireless telephone, a voice-over internet protocol (VOIP) telephone, a personal digital assistant (PDA) and any other device capable of receiving telephone calls) and a second device 202, 302 (e.g., a laptop computer, a desktop computer, a PDA, and/or any other device having a memory 212, 312 and local search function 211, 311) with a same first entity (401).

Next, in response to a communication between the first device 201, 301 and an external device 203, 303 associated with a different second entity, automatically communicating an identifier (e.g., a name, a telephone number, etc.) associated with the external device 203, 303 to a second device 202, 302 so as to cause the second device 202, 302 to locally search (e.g., local search engine 211, 311) memory 212, 312 within the second device 202, 302 for information associated with the identifier (404). The identifier can also be communicated to the second device 202, 302 so as to cause the second device 202, 302 to search the internet (e.g., using internet browser 214, 314) for additional information associated with the identifier. Communications between the first and second devices can be direct (e.g., via point-to point communication), as discussed above with regard to FIG. 3, or indirect (e.g., via a server), as discussed above with regard to FIGS. 1-2.

Once the local search (and, optionally, the internet search) is completed, then the first device 201, 301 and/or the second device 202, 302 will display (e.g., on display 215, 315) the information so as to provide the first entity with context for the incoming communication (406). That is, the second device 202, 302 can communicate this information back to the first device 201, 301, where it is displayed. Alternatively, the second device 202, 302 itself can display the information.

The processes 404-406 may be performed based on default settings. However, the method embodiment can comprise, prior to performing processes 404-406, receiving instructions from the first entity designating how the processes 404-406 should be performed (402). These defaults settings and/or user-provided instructions can designate, for example, the types of communications to respond to (e.g., incoming and/or outgoing telephone calls, the types of searches (e.g., local and/or internet), the type(s) of information to be displayed (e.g., web pages, images, documents by type, etc.), the specific device or devices (e.g., a device address) on which the information is to be displayed, the specific identifier or identifiers (e.g., a caller ID) for which information is to be displayed, the specific item or items of information (e.g., a named document, email message or web address) to be displayed in response to a specific identifier, the time-frame of the information (e.g., only information accessed or viewed within a given time period), etc. Thus, depending upon the default settings and/or user-provided instructions, not all communications will initiate automated searches at process 404 and displays at process 406.

Finally, in addition to displaying the retrieved information found pursuant to a local search (and, if applicable, the retrieved additional information found pursuant to an internet search), this information can also be communicated, by the first device 201, 301 or the second device 202, 302, to the second entity that is associated with the external device 203, 303 (at process 404). Alternatively, rather than sending the actual retrieved information (e.g., files, text, etc.) to the second entity, links or pointers (e.g., suggested keywords) may be sent that will allow the second entity to retrieve the information. Information communicated to the second entity may be over any external device associated with the second entity. For example, the initial communication with the second entity may be over a telephone; however, the retrieved information may be communicated by email, instant message, etc. to the second entity's computer.

As will be appreciated by one skilled in the art, the present invention may be embodied as a system or method, as described above. It may also be embodied as a service to be performed by a service provider or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the entity's computer, partly on the entity's computer, as a stand-alone software package, partly on the entity's computer and partly on a remote computer or entirely on the remote computer or server. In the latter scenario, the remote computer may be connected to the entity's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of system, method, service and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a system and method for automating the exchange of information between the multiple personal computerized devices of an entity so as to provide context for communications, such as incoming and/or outgoing telephone calls, with other entities. The system and method associate one entity with multiple devices (e.g., home and office desktop computers, laptop computers, personal digital assistants (PDAs), wired telephones, wireless telephones, voice-over internet protocol (VOIP) telephones, etc.). Communications over a device (e.g., one of the various types of telephones) are tracked. Then, for a given communication, an identifier (e.g., a caller ID from an incoming telephone call) is communicated to at least one other device. The other device performs a local and/or internet search for information associated with that particular identifier. The retrieved information is then displayed so as to provide the entity with essentially instantaneous context for the given communication. The system can be implemented using client-server network technology or, alternatively, using point-to-point communication technology.

What is claimed is:

1. A system comprising:
   a first device associated with an entity;
   at least one second device associated with said entity, wherein said second device comprises a memory; and
   a server in communication with said first device and said second device,
   wherein said server detects communications over said first device and, for at least one communication between said first device and an external device, automatically communicates an identifier associated with said external device, to said second device,
   wherein said second device receives said identifier and locally searches said memory for information associated with said identifier, and
   wherein at least one of said first device and said second device displays said information so as to provide said entity with context for said communication.

2. The system according to claim 1, said first device having a caller identification function and comprising one of a wired telephone, a wireless telephone, a voice-over internet protocol (VOIP) telephone, and a personal digital assistant (PDA).

3. The system according to claim 1, wherein said server receives instructions from said entity designating at least one of a type of information to be displayed, a specific device on which said information is to be displayed, a specific identifier for which said information is to be displayed, and a specific item of information to be displayed in response to said specific identifier and wherein said server processes said communications according to said instructions.

4. The system according to claim 1, wherein said identifier comprises one of a name and a telephone number.

5. The system according to claim 1, wherein said information comprises at least one of a web page, a web address, an image, a message, a document, a file and a folder.

6. The system according to claim 1, wherein said second device further comprises an internet browser and uses said internet browser to search for additional information associated with said identifier, and wherein said at least one of said first device and said second device displays said additional information.

7. The system according to claim 1, wherein one of said first device and said second device further communicates said information to a second entity associated with said external device.

8. A system comprising:
   a first device associated with an entity; and
   a second device associated with said entity, wherein said second device comprises a memory and is in communication with said first device,
   wherein, in response to a communication between said first device and an external device, said first device automatically communicates to said second device an identifier associated with said external device,
   wherein said second device receives said identifier and locally searches said memory for information associated with said identifier, and
   wherein at least one of said first device and said second device displays said information so as to provide said entity with context for said communication.

9. The system according to claim 8, further comprising a point-to-point communication system connecting said first device and said second device.

10. The system according to claim 8, said first device having a caller identification function and comprising one of a wired telephone, a wireless telephone, a voice-over internet protocol (VOIP) telephone, and a personal digital assistant (PDA).

11. The system according to claim 8, wherein at least one of said first device and said second device receive instructions from said entity designating at least one of a type of information to be displayed, a specific device on which said information is to be displayed, a specific identifier for which said information is to be displayed, and a specific item of information to be displayed in response to said specific identifier.

12. The system according to claim 8, wherein said identifier comprises one of a name and a telephone number.

13. The system according to claim 8, wherein said information comprises at least one of a web page, a web address, an image, a message, a document, a file and a folder.

14. The system according to claim 8, wherein said second device comprises an internet browser and uses said internet browser to search for additional information associated with said identifier, and wherein said at least one of said first device and said second devices displays said additional information.

15. The system according to claim 8, wherein one of said first device and said second device further communicates said information to a second entity associated with said external device.

16. A method for automating the exchange of information between multiple devices, said method comprising:
   in response to a communication between a first device and an external device, automatically communicating an identifier associated with said external device to a second device so as to cause said second device to locally search memory within said second device for information associated with said identifier, wherein said first device and said second device are associated with an entity; and
   displaying by at least one of said first device and said second device said information so as to provide said entity with context for said incoming communication.

17. The method according to claim 16, said first device having a caller identification function and comprising one of a wired telephone, a wireless telephone, a voice-over internet protocol (VOIP) telephone, and a personal digital assistant (PDA).

18. The method according to claim 16, further comprising receiving instructions from said entity designating at least one of a type of information to be displayed, a specific device on which said information is to be displayed, a specific identifier for which said information is to be displayed, and a specific item of information to be displayed in response to said specific identifier.

19. The method according to claim 16, wherein said identifier comprises one of a name and a telephone number.

20. The method according to claim 16, wherein said information comprises at least one of a web page, a web address, an image, a message, a document, a file and a folder.

21. The method according to claim 16, wherein said communicating of said identifier further comprises communicating said identifier so as to cause said second device to search the internet for additional information associated with said identifier and wherein said displaying further comprises displaying said additional information.

22. The method according to claim 16, further comprising communicating, by one of said first device and said second device, said information to a second entity associated with said external device.

23. A computer program product comprising a non-transitory computer usable medium for having computer usable program code embodied therewith, said computer program code comprising a computer usable program code configured to perform a method of automating the exchange of information between multiple devices, said method comprising:
- in response to a communication between a first device and an external device, automatically communicating an identifier associated with said external device to a second device so as to cause said second device to locally search memory within said second device for information associated with said identifier, wherein said first device and said second device are associated with an entity; and
- displaying by at least one of said first device and said second device said information so as to provide said entity with context for said incoming communication.

24. The computer program product according to claim 23, said first device having a caller identification function and comprising one of a wired telephone, a wireless telephone, a voice-over internet protocol (VOIP) telephone, and a personal digital assistant (PDA).

25. The computer program product according to claim 19, wherein said method further comprises receiving, by any one of said first device and said second device, instructions from said entity designating at least one of a type of information to be displayed, a specific device on which said information is to be displayed, a specific identifier for which said information is to be displayed, and a specific item of information to be displayed in response to said specific identifier.

* * * * *